June 4, 1968  J. MEDNEY  3,386,872
METHOD OF MAKING FILAMENT WOUND, COMPOUND CURVED SHELLS
Filed Oct. 15, 1964  3 Sheets-Sheet 2

INVENTOR.
JONAS MEDNEY
BY
Leonard H. King
ATTORNEY.

June 4, 1968  J. MEDNEY  3,386,872
METHOD OF MAKING FILAMENT WOUND, COMPOUND CURVED SHELLS
Filed Oct. 15, 1964  3 Sheets-Sheet 3

INVENTOR.
JONAS MEDNEY
BY
Leonard H. King
ATTORNEY.

3,386,872
METHOD OF MAKING FILAMENT WOUND,
COMPOUND CURVED SHELLS
Jonas Medney, Oceanside, N.Y., assignor to Koppers
Company, Inc., a corporation of Delaware
Filed Oct. 15, 1964, Ser. No. 403,974
6 Claims. (Cl. 156—173)

ABSTRACT OF THE DISCLOSURE

A mandrel having circular transverse cross sections is covered by a flexible bag and a layer of resin impregnated filaments are wound over the bag to form a shell, a band is secured around the mid portion of the shell and the band, the shell, and the bag are cut to form two separate shells. Each shell and bag portion is placed on and conformed to a mandrel having a compound curved surface; the shell is rigidized; the shell and bag removed; the bag removed from the shell; the shell is replaced on the mandrel; and the resin of the shell is cured to produce a filament reinforced resin shell having a compound curved surface.

---

This invention relates to filament winding of compound curved shells and more particularly to a method of making same.

For purposes of illustrating the invention, but without being limited thereto, radomes will be used as an example of compound, curved shells. Radomes, intended to provide housings for electronic sensing equipment, have in the past been formed in a variety of ways using resin-bonded glass fibers. Many difficulties have been encountered in the prior art methods, particularly in the filament winding of small radomes having a volume of 100 cubic feet or less. As will be fully explained hereinafter, the present invention overcomes many of the shortcomings of the prior methods, some of which will generally be discussed now.

Attempts have been made to apply circular windings to a male mold member. Another method winds resin-bonded glass fibers longitudinally with respect to the form on which it is wound. This last method depends upon the adhesive quality of the resin to hold the fibers in place. A method combining circular and longitudinal winding techniques has also been tried. Still another prior art method of winding radomes comprises the step of first, winding a layer of resin-bonded fibers to a particular thickness and second, curing the resin. The two steps are alternately repeated until the desired wall thickness is built up. Finally, a method using a low melting point mandrel, say of Wood's metal, has been tried. The resin-bonded glass fibers were wound on the mandrel, the resin cured and the mandrel melted to release the finished product. A variation on this last method is to use a multipart mandrel that can be taken apart to release the radome.

All of the aforementioned methods of the prior art have one or more undesirable features or results. Generally speaking, the products formed thereby lack homogeneity. The wall thicknesses and the composition thereof were not uniform due to variations in resin and fiber proportions. Some areas were resin-starved and some areas were resin-rich, resulting in a product which distorted both signal transmission and reception.

Further disadvantages of the prior art are evident in the circular and longitudinal winding techniques that have been employed. Circular windings are made under zero tension so that it was necessary to rely on the limited adhesive qualities of the resin to prevent fiber slippage which would produce air spaces. A higher filament tension would result in more slippage, particularly at the tapered end of the radome, because a tensioned fiber tends to follow a geodesic path. Circular windings are not geodesic. Fiber slippage, which was unavoidable in the prior art, resulted in porous windings that had bad high frequency radiation capability and transmission.

The prior art method also resulted in reduced strength characteristics in the finished product. Circular windings had resin-starved portions at areas of small radius and resin-rich portions at relatively flat areas. In winding longitudinally there was a tremendous build-up at the small radius end of the radome. This necessitated machining or grinding to remove the excess fiber ends. As a direct result, the strength of the finished product was materially reduced.

The present invention adds novel steps to conventional winding techniques and in so doing, two compound curved shells, in this case radomes, by way of example, are produced on a single form that may be used many times over.

The present invention permits the winding of resin-bonded filaments in a geodesic path so that the slippage problem discussed hereinabove is virtually eliminated. Accordingly, use of the instant invention assures that there are no air spaces or resin-starved areas. Finish grinding which produces cut fibers and a consequent reduction in strength is kept to a minimum. The instant method causes no interlaminar slip such as was found in prior production methods where it was necessary to cure the article several times during manufacture.

The product formed by the method of the present invention has the glass fibers oriented at the precise angle required to impart optimum strength. Uniform resin and glass distribution is also obtained in addition to eliminating filament build-up in areas of small radius. By winding in accordance with the present method and by using glass fibers and a resin having indexes of refraction close to each other, the radome will be partly translucent. This feature is important from a quality control standpoint in that the article may easily be inspected under light.

Briefly stated, the present invention requires the use of a circular, multidiameter mandrel. The circumference at each transverse station of the mandrel is equal to the inside peripheral dimension of the noncircular finished product at comparable stations. A quilted polyethylene bag is fitted to the mandrel and a geodesic winding of resin-bonded filaments is applied thereto where required. A nylon band is secured circumferentially to the midpoint of the winding by means of a flexible, rapid-setting resinous adhesive and when this resin, but not the filament-bonding resin, has set, the nylon band, the windings and the bag are cut at the midpoint of the nylon band. Pressurized air is admitted beneath the quilted polyethylene bag to permit removal of the two uncured radomes and the respective polyethylene bag portions from the mandrel, each one of which is then placed on a male mold having the exact shape of the radome.

The winding is then frozen to harden but not cure the winding and resin so that the polyethylene bag portion may be removed without disturbing the positioning of the filaments. After the bag portion is removed, the mold is cleaned, coated with a release agent and the windings reapplied thereto. The winding and resin are then vacuum bagged to reproduce the exact shape of the mold and autoclaved to cure the resin.

Accordingly, it is an object of the present invention to provide an improved method for utilizing adhesively secured fibers to form a compound curved shell.

Another object is to provide an improved method for forming radomes wherein a reusable mandrel is employed.

An additional object is to provide an improved method for forming radomes wherein a single, reusable mandrel produces two radomes simultaneously.

A further object is to provide a method for winding resin-bonded glass fibers to produce a radome free of resin-starved areas, air spaces and fiber slippage.

A still further object is to provide a method for producing radomes having uniform fiber and resin distribution.

As a feature of the present invention, a partly translucent article is formed by employing glass and resin each having an index of refraction close to the other.

These and other features, objects and advantages of the invention will, in part, be pointed out with particularity and will, in part, become obvious from the following more detailed description of the invention, taken on conjunction with the accompanying drawing which forms an integral part thereof.

In the various figures of the drawing, like reference characters designate like parts.

Figure 1:
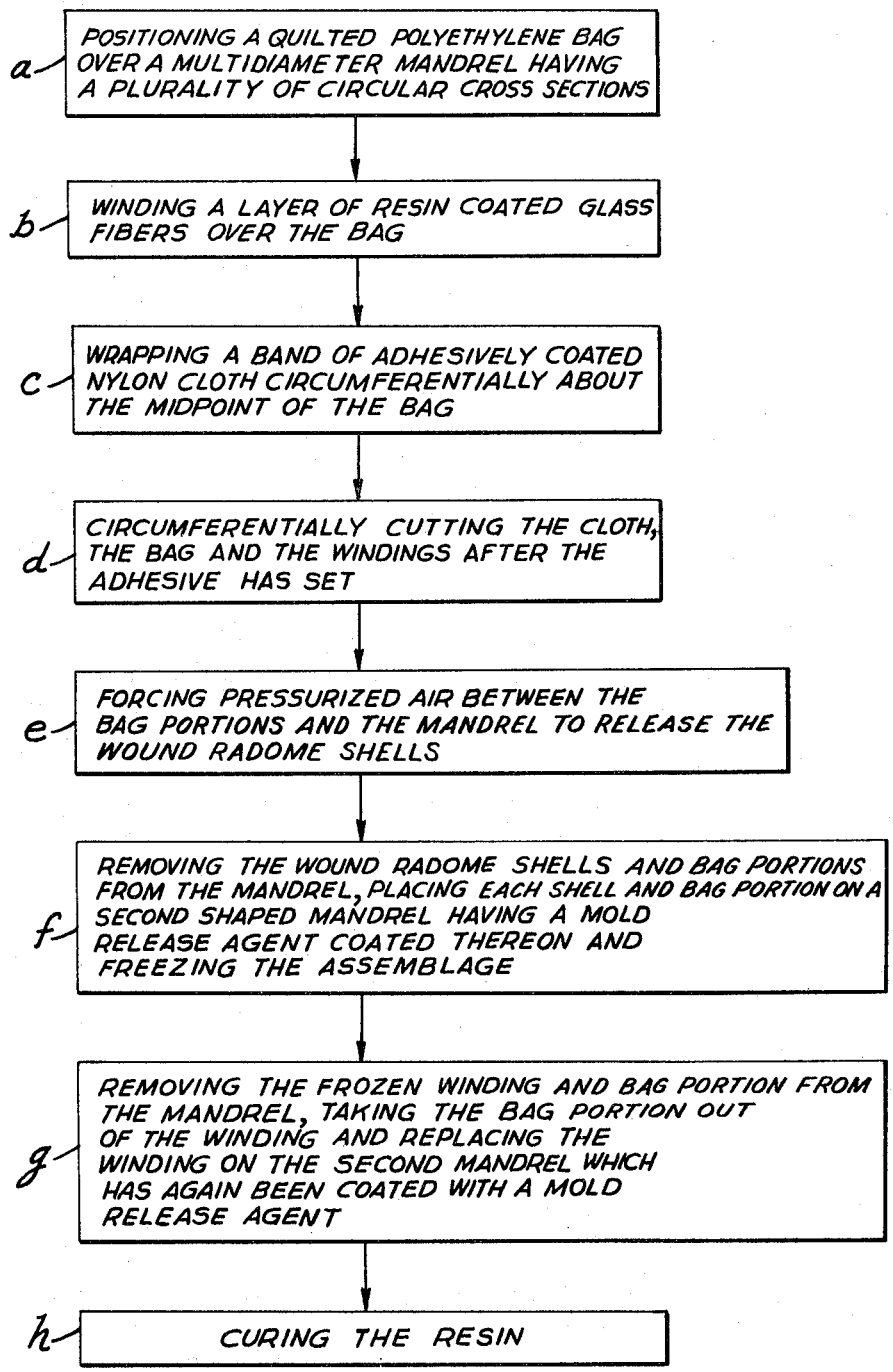
FIG. 1 is a flow chart describing the sequential steps of the method of the present invention with respect to a particular product.

Referring now to the drawing, the present invention is outlined as successive steps $a-h$ in FIG. 1. The various steps will now be discussed in detail and in conjunction with representative structure illustrated in FIG. 2 to FIG. 6. A radome is used throughout the specification to illustrate the configuration of one possible product formable by means of the teachings of the present invention. It should be understood, however, that this is intended only to be representative and the scope of the invention is not limited thereto.

Figure 2:
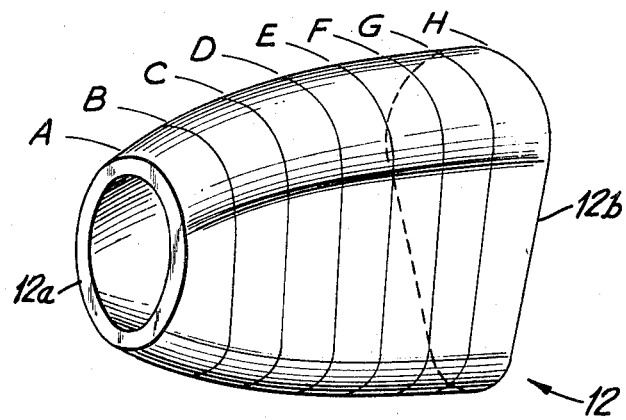
FIG. 2 is a pictorial view of a finished product formed by the present method.
Figure 3:
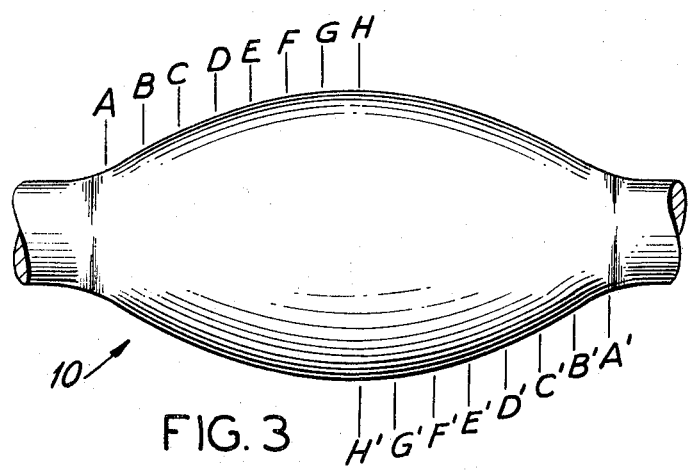
FIG. 3 is a side elevational view of the mandrel employed to simultaneously form two of the shells illustrated in FIG. 2.

A round multidiameter mandrel 10 (FIG. 3) is formed and for purposes of explanation is subdivided into transverse, axially spaced stations A–H and A'–H'. At every station, and in fact at all points in between stations, the mandrel is circular in cross section. The finished product 12, a radome, shown in FIG. 2, is also subdivided, for purposes of this discussion, into transverse stations A–H which axially correspond to similarly marked points on the mandrel. It should be noted, however, that while the radome is not circular in cross section, the circumferential dimension at any of its transverse stations is the same as the circumferential dimension at corresponding mandrel stations.

Figure 4:
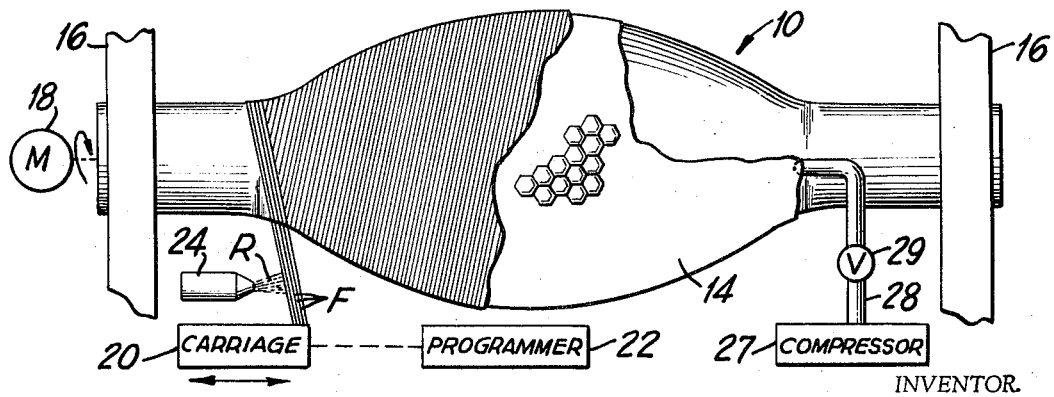
FIG. 4 is a sectional side elevational view illustrating a particular step in the method of the present invention.
Figure 5:
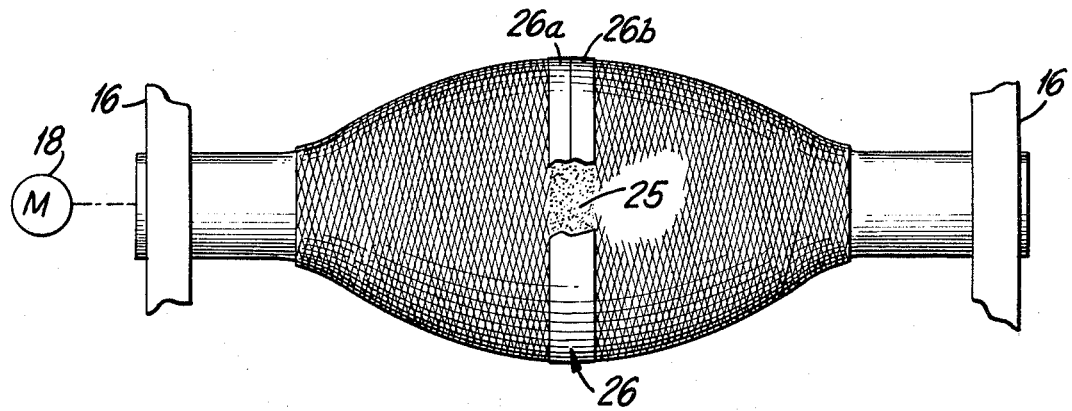
FIG. 5 is a side elevational view illustrating another step in the method of the present invention.
Figure 6:
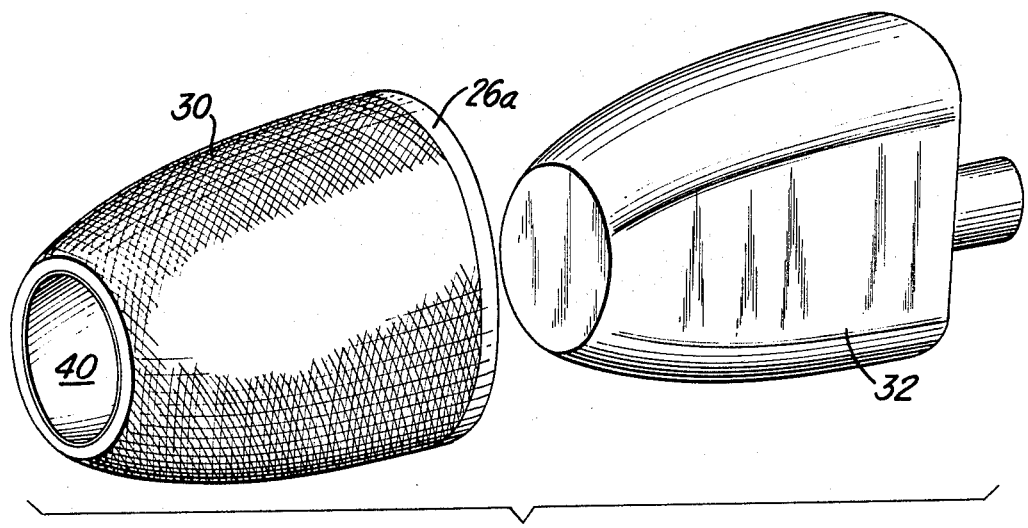
FIG. 6 shows in exploded pictorial form the wound skin being applied to a second mandrel for final shaping and curing.

In FIG. 4, it will be seen that a quilted, polyethylene bag 14 is fitted and heat sealed to the mandrel 10 which is supported in machine frame 16 so that it may be rotated on its longitudinal axis by motor 18. Carriage 20 is adapted to move longitudinally in order to continuously apply filaments F to the mandrel while it is being rotated. Programming means 22 controls the feed rate of the carriage whereby, in combination with mandrel rotation, the winding angle of the filaments is determined. While the windings are being applied they are coated with an epoxy resin R from a supply source 24. Alternatively to the impregnating arrangement illustrated, the fibers may be passed through a liquid resin bath before their application to the mandrel. Still other impregnating methods known in the art may be employed without diminishing the scope of the present invention.

The so-called epoxide resins are presently preferred for the purpose of this application. Epoxide compounds are those compounds having an ether oxygen atom joined to two vicinal carbon atoms. The term "epoxide resin," as used in the present specification and in the appended claims, denotes the resinous reaction product of certain of these epoxide compounds and compounds having available hydrogen atoms linked to carbon atoms by oxygen atoms, as, for example, polyhydric phenols and polyhydric alcohols. A particularly useful epoxide resin is the reaction product of an epihalohydrin and a polyhydric phenol, as exemplified by bisphenol-epichlorohydrin. Suitable epoxide resins include the reaction products of epihalohydrins and a polyhydric alcohol such as ethylene glycol, propylene glycol, trimethylene glycol and the like. Other equivalent epoxide resins are well known to those skilled in the plastics art. Reference is made to "Epoxy Resins" by Irving Skeist, Reinhold Publishing Corporation, New York, N.Y. (1958).

Other suitable thermosetting resins include polyester resins, and in particular the alkyd resins comprising the reaction product or copolymers of polyhydric alcohols and dibasic acids. Typical of the large number of available polyester resins are the copolymers of phthalic anhydride and a polyhydric alcohol such as ethylene glycol, diethylene glycol or glycerin, maleic anhydride and a polyhydric alcohol, sebacic acid and a polyhydric alcohol, and diethylene glycol and bis-allyl carbonate. These and equivalent polyester resins are advantageously partially polymerized prior to their incorporation in the plastic composition, and may be modified in the manner known in the art by the admixture therewith of such modifiers as epoxidized oils and unsaturated fatty acids. If desired, suitable polyester polymerization catalysts well known to the art may also be included in composition.

Other thermosetting polymers that can be employed in the composition include the acrylic compounds, and the phenolformaldehyde, furfural-formaldehyde, and resorcinol-formaldehyde resins. Moreover, the thermosetting material need not be in every case what is commonly and rather loosely known as a "resin." For example, substances such as phthalic anhydride and diallyl phthalate may be employed as a thermosetting reactive material in the plastic composition.

During the winding step of the present method, the filaments follow a geodesic path which is defined as the shortest line on a curved surface connecting two points. Actually a series of different paths will follow as build-up is completed to form the curved portion 12a. Later, as the flat portion 12b of the radome is reached, circles are wound.

The next step in the method is the application of a transverse band 26 of nylon cloth. The band is secured about the midpoint of the winding and is treated with a rapid set, flexible adhesive 25, a suitable formulation being 100 parts by weight of Epon 828, 8 parts by weight of DTA, and 50 parts by weight of LP-3. Once the adhesive 25 is set, the nylon cloth band 26, the winding and the polyethylene bag 14 are transversely cut in half at the midpoint of the band 26 (FIG. 5) to form two radomes. It should be particularly noted that the resin R applied to the filaments has not been cured up to this time. The filaments are therefore still flexible but are held in place by the circumferential band which is now in two parts, 26a and 26b.

As the next step in the process, pressurized air from supply source 27 is introduced between the quilted polyethylene bag and the mandrel via conduit 28 and pressure regulating valve 29. The spaces formed by the quilting permits a flow of air between the mandrel and the bag and allows the two separated radome sections to be lifted off the mandrel intact.

In this condition, the still uncured winding 30 with its respective bag portion 40 is placed on another mandrel 32 having the exact shape desired in the finished product. Advantageously, a mold release agent is applied to mandrel 32 before the winding 30 and its respective bag portion 40 is put in place. The winding is then frozen at 0° F. for one hour to temporarily impart and maintain the desired shape. The quilted bag portion 40 may then be removed from the winding or shell portion 30 without disturbing the resin or the windings.

The mold is then cleaned and a mold release agent reapplied thereto. The frozen winding without the liner is reapplied to the mandrel; the assembly is vacuum bagged and then autoclaved at 260° F. at 100 p.s.i. for four hours.

A preferred resin and glass combination is 100 parts by weight of liquid epoxy resin such as Ciba resin 6005, 85 parts by weight of NMA (nadic methyl anhydride) and 1.8 parts by weight of BDMA (benzol dimethyl amine). The glass fiber may be Owens-Corning HTS (high tensile strength). The advantage of this particular formulation is that a partly translucent product results which permits visual inspection thereof.

By way of summary, the finished product obtained after the last step of the process has the following advantages over the products fabricated by prior art methods:

(1) No resin-starved areas;
(2) No air spaces resulting from slipping of fibers;
(3) A minimum of cut edges;
(4) Grinding of product kept to minimum;
(5) Product has increased strength;
(6) Faster production;
(7) No interlaminar slip problem, such as results from prior production methods where it was necessary to cure articles several times during manufacture;
(8) Uniform resin and glass distribution is obtained;
(9) Glass at the desired angle for optimum strength; and
(10) By using glass and resin with close index of refraction, a partly translucent article is obtained.

As use herein, the rapid set flexible adhesive for the circumferential band is comprised of the following:

Epon 828 _____ Liquid epoxy resin.
DTA _____ Diethylene triamine.
LP-3 _____ Liquid polymer.

There has been disclosed heretofore the best embodiments of the invention presently contemplated and it is to be understood that various changes and modifications may be made by those skilled in the art without departing from the spirit of the invention.

What is claimed is:
1. The method of forming a compound curved shell comprising the steps of:
 (a) positioning a flexible on the a first mandrel having a plurality of different circular cross sections;
 (b) winding a layer of [adhesively] resin impregnated filaments over the bag to form a shell;
 (c) applying a band of adhesively coated fabric circumferentially about the midpoint of the shell;
 (d) circumferentially cutting through both the band of fabric, the shell, and the bag after the fabric adhesive has set to form two separate shells each having a portion of the bag therein;
 (e) removing each one of shell and bag portions from the first mandrel and successively placing and conforming each said portion to second, compound curved mandrel having the size and shape of the finished article;
 (f) rigidizing each shell while it is on the second mandrel;
 (g) removing each rigidized shell and bag from said second mandrel;
 (h) removing the bag portion from inside each shell portion; and
 (i) replacing the shell portions on the second mandrel and curing the resin of each shell portion.
2. The method of claim 1 wherein the rigidizing step includes the step of freezing the shell so that the uncured resin becomes rigid.
3. The method of claim 1 wherein removing each of the shell and bag portions comprises the step of forcing pressurized air between the bag and the mandrel.
4. The method of forming a compound curved shell comprising the steps of:
 (a) positioning a flexible bag on a first mandrel having circular transverse cross sections that are equal in circumference to the perimeter of comparable transverse cross sections of the compound curved shell;
 (b) winding a layer of resin impregnated filaments over the bag to form a shell;
 (c) applying a band of material circumferentially about the midpoint of the shell;
 (d) treating the band with an adhesive;
 (e) setting the band adhesive;
 (f) circumferentially cutting through the band, the shell and the bag to form two separate shells each having a portion of the bag therein;
 (g) removing each one of the shell and bag portions from the first mandrel and successively placing and conforming each said portion to a second compound curved mandrel having the size and shape of the finished article;
 (h) rigidizing each shell while it is on the second mandrel;
 (i) removing each rigidized shell and bag from said second mandrel;
 (j) removing the bag portion from inside each shell portion; and
 (k) replacing the shell portions on the second mandrel and curing the resin of each shell portion.
5. The method of claim 4 wherein the rigidizing step includes the step of freezing the shell so that the uncured resin becomes rigid.
6. The method of claim 4 wherein removing each of the shell and bag portions comprises the step of forcing pressurized air between the bag and the mandrel.

References Cited
UNITED STATES PATENTS

| | | | |
|---|---|---|---|
| 3,210,228 | 10/1965 | Bluck | 156—173 |
| 3,008,859 | 11/1961 | Smack | 156—189 XR |
| 1,733,405 | 10/1929 | Gammeter | 156—250 XR |
| 2,132,324 | 10/1938 | Schrank | 156—344 |

EARL M. BERGERT, *Primary Examiner.*

PHILIP DIER, *Examiner.*

UNITED STATES PATENT OFFICE

CERTIFICATE OF CORRECTION

Patent No. 3,386,872                        June 4, 1968

Jonas Medney

It is certified that error appears in the above identified patent and that said Letters Patent are hereby corrected as shown below:

Column 5, line 50, after "flexible" insert -- bag --; line 52, cancel "[adhesively]"; line 62, after "to" insert -- a --.

Signed and sealed this 4th day of November 1969.

(SEAL)
Attest:

Edward M. Fletcher, Jr.                      WILLIAM E. SCHUYLER, JR.
Attesting Officer                              Commissioner of Patents